(12) United States Patent
Saari

(10) Patent No.: US 7,072,456 B1
(45) Date of Patent: Jul. 4, 2006

(54) PROCEDURE FOR INTERPROCESS DATA TRANSFER

(75) Inventor: Jarmo Saari, Jyväskylä (FI)

(73) Assignee: Nokia Corporation, Espoo (FI)

( * ) Notice: Subject to any disclaimer, the term of this patent is extended or adjusted under 35 U.S.C. 154(b) by 509 days.

(21) Appl. No.: 09/599,315

(22) Filed: Jun. 22, 2000

Related U.S. Application Data

(63) Continuation-in-part of application No. PCT/FI98/00980, filed on Dec. 14, 1998.

(30) Foreign Application Priority Data

Dec. 22, 1997 (FI) .................................. 974608

(51) Int. Cl.
*H04M 3/42* (2006.01)

(52) U.S. Cl. .................. 379/201.03; 709/201; 709/229

(58) Field of Classification Search ........... 379/201.03; 709/201, 229
See application file for complete search history.

(56) References Cited

U.S. PATENT DOCUMENTS

| 4,530,051 | A | | 7/1985 | Johnson et al. ............. 709/203 |
| 5,153,909 | A | * | 10/1992 | Beckle et al. .......... 379/265.03 |
| 5,218,713 | A | | 6/1993 | Hammer et al. ............ 709/201 |
| 5,583,920 | A | * | 12/1996 | Wheeler, Jr. ............. 379/88.01 |
| 6,028,917 | A | * | 2/2000 | Creamer et al. ....... 379/100.01 |
| 6,282,281 | B1 | * | 8/2001 | Low .......................... 379/230 |

OTHER PUBLICATIONS

International Search Report for PCT/FI98/00980.

* cited by examiner

*Primary Examiner*—Ahmad F. Matar
*Assistant Examiner*—Quynh H. Nguyen
(74) *Attorney, Agent, or Firm*—Squire, Sanders & Dempsey LLP

(57) ABSTRACT

Procedure for interprocess data transfer in a telephone exchange system in which processes transmit messages between themselves in order to provide services between processes and in which a first process requests a service form a second process, which, based on the request, starts providing the service to the first process and terminates the service when a predetermined condition is met. The service is refreshed when the first process wishes the service to be continued.

6 Claims, 1 Drawing Sheet

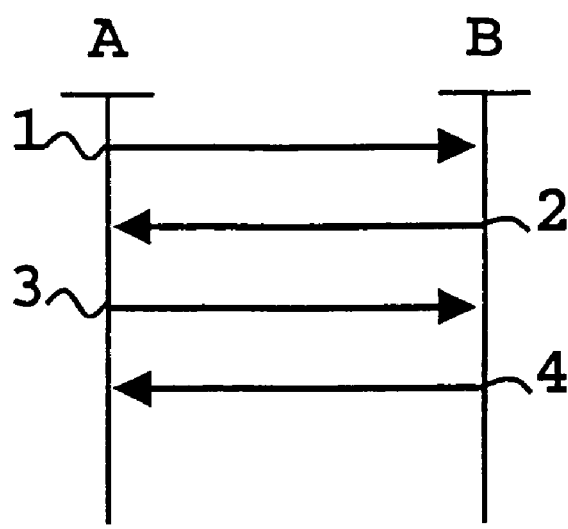

PROCEDURE FOR INTERPROCESS DATA TRANSFER

This application is a Continuation-In-Part of International Application PCT/FI98/00980 filed 14 Dec. 1998.

The present invention relates to a procedure for interprocess data transfer as defined in the preamble of claim 1.

A telephone exchange system comprises several separate processes that communicate between themselves. Data transfer between processes is often tied to a given point of time or a given event. Such an interprocess data transfer event is called a service. The services are of a very fixed nature, i.e. they comprise little dynamics. In the present context, the content of the service is of no consequence. A service request remains valid until a certain termination criterion is met; such a criterion may be e.g. a time limit, a number of events or a given event.

However, the management of such services is very difficult. Predetermined termination criteria keep system resources occupied to no purpose because the required duration of service may vary. The need for a service may disappear before the service is terminated, which constitutes an unnecessary load on the service provider providing an unnecessary service. If the service is terminated too soon, then the service parameters must be sent again.

The object of the present invention is to eliminate the drawbacks described above. A specific object of the present invention is to present a new procedure for the management of services.

As for the features characteristic of the present invention, reference is made to the claims.

Using the procedure of the invention, a first process requesting a service need not give a new service request to a second process if the service has been used before. A service that has been activated earlier can be continued by only refreshing it. Refreshment differs from normal service initiation in that the first process does not send any service parameters to the second process, but the second process executes the service in accordance with parameters received earlier.

Using the procedure of the invention, refreshment of a service is effected even if the service is not being used. When requesting a service, the first process requesting the service informs the second process providing the service that the service request concerns a service to be refreshed. In this case, the second process saves the service parameters. When receiving a mere refresh message, the second process will be able to offer the correct service to the first process.

Using the procedure of the invention, refreshment of a service is effected when the service is being used. If it has been defined that the service is to be terminated after a certain number of times of service but the service must still be continued beyond this, the service is refreshed before the specified number of times of service is reached. This makes it possible to avoid restarting the service and sending the service parameters over and over again.

Using the procedure of the invention, refreshment of a service can also be effected at suitable intervals. The refresh intervals need not be tied to any given occurrence or to an exact instant of time, but a time is calculated for the process which allows the most effective refreshment of the service. With suitable refresh intervals, the service remains well under control and it is not necessary to send a separate request each time the service is needed.

The procedure of the invention also allows easier operation in failure or overload situations. The service can be removed and then reintroduced by simply refreshing it. When this is done, the service will be started as defined in the first service request.

The present invention provides the advantage that the service duration can be set to a proper value. A separate request is not needed for each service, but by using suitable refresh intervals, the services can be kept well under control. The procedure does not impose a load of unnecessary service on the service provider. In failure and overload situations, services can be removed and reintroduced in a simple manner. The procedure reduces interprocess data transfer relating to service management without impairing the efficiency of the services.

In the following, the invention will be described by the aid of a few examples of its embodiments by referring to the attached drawing, which represents data transfer between two processes.

Let the first process be A and the second process B. A data transfer event between the processes begins when process A requests a service from process B. Process A transmits all the parameters needed in the service to B. This action is represented by arrow 1 in FIG. 1. In accordance with this service request and the parameters received with it, process B starts serving process A, which is represented by arrow 2. When process A finds that the termination criterion for the service is approaching fulfilment, it refreshes the service request to process B, arrow 3. Process B carries on the service to process A in accordance with the original parameters received at the initiation 1 of the service. Process B terminates the service when the predetermined termination criterion has been fulfilled, arrow B. The termination criterion may be e.g. a time limit, a number of events, or a given event, or it may also be a termination request sent by A.

The invention can also be applied e.g. in the case of fixed or permanent services so that the service can be refreshed any time, even when it is not being used. In this case, the data transfer event begins in the same way as in the previous example with process A requesting a service from process B. Process A now informs process B, besides requesting a service, that the service in question is a service to be refreshed. Process B saves the service parameters. The service can now be terminated when the predetermined termination criterion has been fulfilled. The service termination criterion may be e.g. time, number of services or any one of the parameters of the application to be executed. Next time when process A needs the service from process B, it will only refresh the original service request, and process B will start the service in accordance with the parameters saved when the service was started the first time.

The invention is not restricted to the examples of its embodiments described above, but many variations are possible within the scope of the inventive idea defined by the claims.

What is claimed is:

1. A procedure for interprocess data transfer in a telephone exchange system in which processes transmit messages between themselves in order to provide services between processes and in which a first process requests a service from a second process, which the second process, based on the request, starts providing the service to the first process and terminates the service when a predetermined condition is fulfilled, wherein the procedure further comprises:

receiving with the second process from the first process a service request comprising service parameters and a notification that the requested service concerns a service to be refreshed;

saving, with the second process, the service parameters;
terminating the service when the predetermined criterion has been fulfilled;
receiving with the second process from the first process a service refresh request without any service parameters, the service refresh request relating to the previously requested service; and
refreshing the service in accordance with the service refresh request and the saved service parameters when the first process wishes the service to be continued or reactivated.

2. The procedure as defined in claim 1, wherein the service parameters given by the first process are saved, and when the second process is started, it provides a service to the first process in accordance with the stored parameters.

3. The procedure as defined in claim 1, wherein the service is refreshed before the requested number of times of service is fulfilled, the service being continued in accordance with the service parameters given by the first process in the service request.

4. The procedure as defined in claim 1, wherein the service is refreshed at predetermined time intervals.

5. The procedure as defined in claim 1, wherein the service is removed in a failure and/or overload situation occurring in the telephone exchange system.

6. The procedure as defined in claim 1, wherein the service is introduced by refreshing it, in which case the service is started in accordance with the original parameters.

* * * * *